US005512117A

United States Patent [19]

Morris

[11] Patent Number: 5,512,117

[45] Date of Patent: Apr. 30, 1996

[54] CHARGE PLATE FABRICATION PROCESS

[75] Inventor: Brian G. Morris, Dayton, Ohio

[73] Assignee: Scitex Digital Printing, Inc., Dayton, Ohio

[21] Appl. No.: 229,114

[22] Filed: Apr. 18, 1994

Related U.S. Application Data

[63] Continuation of Ser. No. 891,333, May 29, 1992, abandoned.

[51] Int. Cl.[6] .......... B32B 31/00

[52] U.S. Cl. .......... 156/155; 156/64; 156/83; 156/196; 156/307.3; 156/630.1; 216/20; 347/76; 403/30

[58] Field of Search .......... 156/307.3, 64, 156/83, 155, 196, 630.1; 403/30; 346/75; 347/76; 216/20

[56] References Cited

U.S. PATENT DOCUMENTS

| | | | |
|---|---|---|---|
| 3,790,953 | 2/1974 | Sugiya | 346/75 |
| 3,975,741 | 8/1976 | Solyst | 346/75 |
| 4,314,866 | 2/1982 | Webber | 156/307.3 |
| 4,334,232 | 6/1982 | Head | 346/75 |
| 4,560,991 | 12/1985 | Schutrum | 346/75 |

*Primary Examiner*—John J. Gallagher
*Attorney, Agent, or Firm*—Barbara Joan Haushalter

[57] ABSTRACT

A charge plate fabrication process provides a charge plate assembly having minimal distortion caused by shifts in temperature and humidity. The fabrication process includes the steps of forming a charge plate coupon having a plurality of charging electrodes and electrical connections on an etchable substrate and providing a ceramic charge plate substrate. An adhesive layer is then applied between the charge plate coupon and the charge plate substrate before assembling the charge plate coupon and the charge plate substrate in a fixture. Finally, the assembly is cured in the fixture.

6 Claims, 2 Drawing Sheets

CHARGE PLATE FABRICATION PROCESS

This is a continuation of application Ser. No. 07/891,333, filed May 29, 1992, now abandoned.

TECHNICAL FIELD

The present invention relates to continuous ink jet printers and, more particularly, to improved construction for the charge plate and catcher assembly in such printers.

BACKGROUND ART

In continuous ink jet printing, electrically conductive ink is supplied under pressure to a manifold region that distributes the ink to a plurality of orifices, typically arranged in a linear array(s). The ink discharges from the orifices in filaments which break into droplet streams. Individual droplet streams are selectively charged in the region of the break off from the filaments and charge drops are deflected from their normal trajectories. The deflected drops may be caught and recirculated, and the undeflected drops allowed to proceed to a print medium.

Drops are charged by a charge plate having a plurality of charging electrodes along one edge, and a corresponding plurality of connecting leads along one surface. The edge of the charge plate having the charging electrodes is placed in close proximity to the break off point of the ink jet filaments, and charges applied to the leads to induce charges in the drops as they break off from the filaments. U.S. Pat. No. 4,560,991, issued Dec. 24, 1985, to W. Shutrum, describes one method of fabricating a charge plate. The charge plate taught by Shutrum is fabricated by electro-depositing the charging electrodes and leads on a flat sheet of etchable material, such as copper foil, to form a so-called "coupon." The coupon is bent in a jig at approximately a 90° angle. The leads are then bonded to a charge plate substrate, and the etchable material is removed.

In the prior art, the charge plate substrate comprises an epoxy resin molded to completely surround the electrodes. This material is subjected to absorbing moisture, which can cause distortion of critical tolerances beyond their specifications. This distortion causes shifts in the positional relationship of the charge electrode to the ink droplet stream. This shift will induce a significant difference in charging current to the deflected droplet, causing an acceptable print head to perform poorly. Temperature changes can also adversely affect print quality. This distortion is magnified for long array ink jet printers exceeding one inch in length. In the prior art, ink jet printing systems are also susceptible to changes in temperature, which can adversely affect print quality.

It is seen then that there exists a need for a charge plate assembly having minimal susceptibility to dimensional changes during fabrication, and dimensional changes caused by environmental conditions.

SUMMARY OF THE INVENTION

These needs are met by the charge plate fabrication process and assembly according to the present invention, wherein the positional relationship of the charge electrode, which is critical to optimum print head performance, is not adversely affected. It is a primary objective of the present invention to provide a charge plate assembly having minimal distortion caused by shifts in temperature and humidity. In the present invention, the distance between adjacent electrodes is controlled by adjusting the initial distance between adjacent electrodes on the formed charge plate coupon to compensate for the coefficients of thermal expansion of the charge plate substrate and the charge plate coupon.

In accordance with one aspect of the present invention, a charge plate assembly fabrication process comprises the steps of: forming a charge plate coupon having a plurality of charging electrodes and electrical connections on an etchable substrate and providing a ceramic charge plate substrate. An adhesive layer is then applied between the charge plate coupon and the charge plate substrate so the charge plate coupon and the charge plate substrate can be assembled in a fixture. Finally, the method comprises the step of curing the assembly in the fixture.

Accordingly, it is an object of the present invention to provide a charge plate wherein distortion caused by sensitivities to temperature and humidity is minimized. It is a further object of the present invention to provide such a charge plate having a correct array length. Other objects and advantages of the invention will be apparent from the following description, the accompanying drawings and the appended claims.

DETAILED DESCRIPTION OF THE PREFERRED EMBODIMENTS

Figure 1:
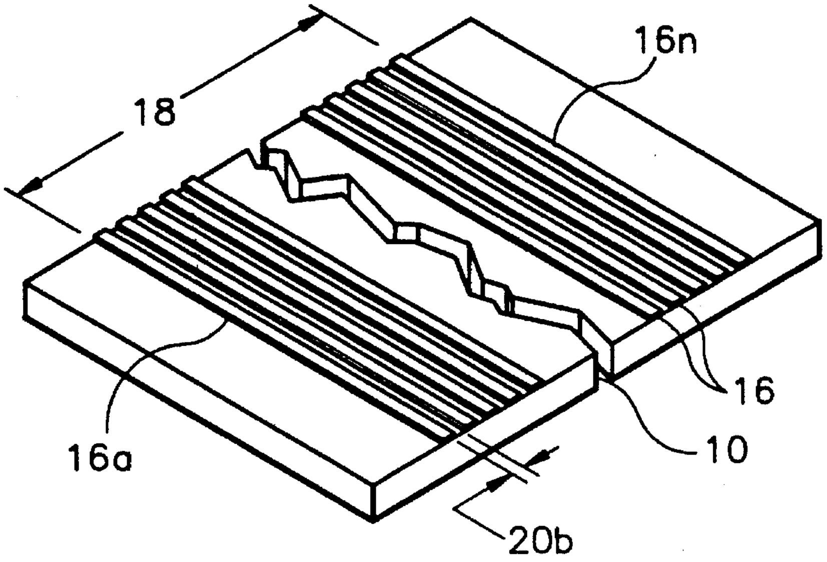
FIG. 1 is a top view of a charge plate coupon.
Figure 2:
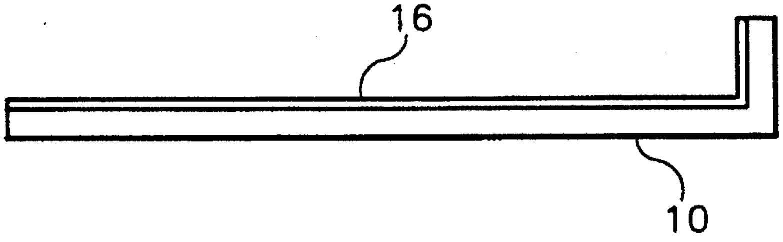
FIG. 2 is a side view of a charge plate coupon of FIG. 1.
Figure 3:
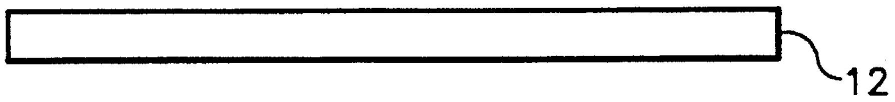
FIG. 3 is a side view of a charge plate substrate.
Figure 4:
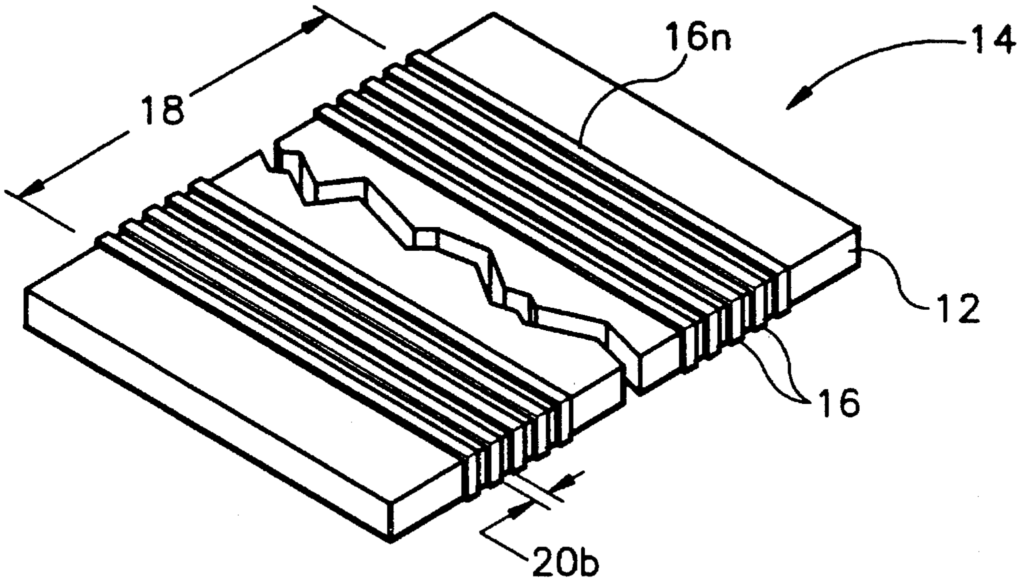
FIG. 4 is a top view of a charge plate assembly of the present invention, including the coupon of FIGS. 1 and 2 and the substrate of FIG. 3.
Figure 5:
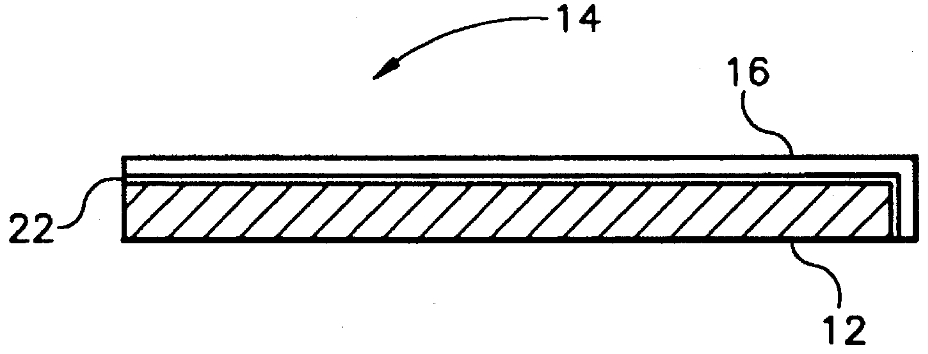
FIG. 5 is a side view of the charge plate assembly of FIG. 4.

Referring to the drawings, a charge plate coupon 10 of FIGS. 1 and 2, and a charge plate substrate 12, of FIG. 3, form a charge plate assembly 14, illustrated in FIGS. 4 and 5. In the charge plate assembly 14 according to the present invention, the positional relationship of charge electrodes 16 is critical to optimum print head performance. Additionally, the distance between adjacent electrodes 16 is controlled by adjusting the initial distance between adjacent electrodes 16 on the formed charge plate coupon 10 to compensate for the coefficients of thermal expansion of the charge plate coupon 10 and the charge plate substrate 12. Finally, it is very important that the droplet stream from the print head (not shown) is in close proximity to the charging electrodes 16 and that the relative position does not change during intended operating conditions.

FIGS. 1 and 2 illustrate a top view and a side view, respectively, of the charge plate coupon 10, which comprises an etchable substrate. The top view of the coupon 10 in FIG. 1 shows an array length **18*a*, which is the distance from the first charging electrode 16*a* to the last charging electrode 16*n*. In FIG. 1, the array length 18*a* refers to a coupon array length, as the array length is associated with the charge plate coupon 10 here. In the preferred embodiment of the present invention, the coupon array length 18*a* is 4.3032 inches, with a total of 1034 charging electrodes 16. The array length 18*a* dimension is substantially smaller than the theoretical length of 4.3042" for a typical 240 drops per inch print head with 1034 active leads. In a typical assembly, an assembled array length or charge plate array length 18*b*, illustrated in FIG. 4, corresponds to a distance X, and the coupon array length 18*a* corresponds to a distance Y, with Y preferably being less than X. Of course, depending on the coefficient of thermal expansion of the material used, X could be less than Y in some instances. During assembly, the array length Y grows by some amount delta X. The present invention, therefore, accounts for this increase in the array length Y, such that Y+delta X=X. That is, the total array length 18*a*** has been modified by an adjusted distance to account for expansion during the assembly stages.

Continuing with FIG. 1, an adjacent lead-to-lead distance **20*a* is shown for all 1034 electrodes. This dimension is also adjusted from the optimum value of 0.004167", since this dimension changes during fabrication as well. For example, the lead-to-lead distance 20*a* in FIG. 1 is equal to 0.004166, whereas the lead-to-lead distance 20*b* in FIG. 4** has changed to 0.004167, as a result of the fabrication process. The change in this dimension, then, is factored in by the present invention.

Referring now to FIG. 2, a side view of the formed charge plate coupon 10 is illustrated. The charge plate coupon 10 is comprised of the plurality of charging electrodes 16 and a plurality of conductors formed on an etchable substrate 24. The etchable substrate 10 is any suitable etchable material such as, for example, berylliumcopper or copper foil, and the substrate 10 is then bent to form a substantially right angle. Typically, this angle is approximately equal to 87°. The conductors and the charging electrodes 16 may be formed by standard photolithography and electroplating techniques. The electrode coupon 10 may be formed as taught by U.S. Pat. No. 4,560,991, issued Dec. 24, 1985, to W. Shutrum.

Referring now to FIG. 3, a side view of the charge plate substrate 12, to be assembled with the charge plate coupon 10 to form the charge plate assembly 14, is illustrated. The charge plate substrate 12 is preferably ceramic and fabricated from 96% alumina having a coefficient of thermal expansion (CTE) of $8.2\times10^{-6}$/°C. Preferably, a front edge of the substrate 12 is tapered away from perpendicularity by 2.5° such that in the assembled charge plate 14, the electrodes 16 do not interfere with the trajectory of any deflected and/or caught droplets.

FIGS. 4 and 5 illustrate a top and side view, respectively, of the charge plate assembly 14, comprised of the charge plate coupon 10 and the charge plate substrate 12. In the top view of the charge plate assembly 14 of FIG. 4, both the coupon array length **18*a* of FIG. 1 and the adjacent lead-to-lead length 20*b* match the optimum values, resulting in the charge plate array 18*b* of FIG. 4**, since the etchable substrate has been removed. For example, for a 240 drops-per-inch (dpi) ink jet printer, the center of each lead should be separated by 1/240. For 1034 leads, the total length is the number of spaces, which is 1033, multiplied by 1/240. This is important since each jet or drop must be aligned in front of each electrode.

In FIG. 5, the side view of the charge plate assembly 14 is shown. The charge plate assembly 14 is assembled by first forming the charge plate coupon 10 with its plurality of charging electrodes 16 and electrical connections on the etchable substrate 24, and providing the ceramic charge plate substrate 12. The next step in the assembly is to apply a thin adhesive layer 28 onto the charge plate substrate 12, between the charge plate coupon 10 and the charge plate substrate 12. The charge plate coupon 10 and the charge plate substrate 12, with the adhesive layer 22, are then assembled in a fixture to align the charge plate coupon 10 and the charge plate substrate 12. Finally, the assembly 14 is cured. In a preferred embodiment, the assembly 14 is cured at a temperature of 150° F. with 140 lbs. of pressure, for approximately two hours. After curing, the etchable substrate 24 is removed by etching.

INDUSTRIAL APPLICABILITY AND ADVANTAGES

The present invention is useful in the field of ink jet printing, and has the advantage of allowing for each ink droplet to be centered with each electrode, to maintain high print quality. The present invention provides the further advantage of accounting for the dimensional changes which occur during fabrication of the assembly. Finally, the present invention provides the advantage of minimizing dimensional shifts of charge plate electrodes during operation, caused by changes in environmental conditions such as temperature and humidity.

Having described the invention in detail and by reference to the preferred embodiment thereof, it will be apparent that other modifications and variations are possible without departing from the scope of the invention defined in the appended claims.

I claim:

1. A method of fabricating a charge plate assembly for an ink jet printer comprising the steps of:

a. forming a charge plate coupon having a plurality of charging electrodes and electrical connections on an etchable substrate;

b. providing a ceramic charge plate substrate;

c. providing an initial adjusted distance between adjacent electrodes to compensate for changes in length of the charge plate coupon due to coefficients of thermal expansion of the charge plate coupon and the charge plate substrate;

d. assembling the charge plate coupon and the charge plate substrate in a fixture by applying a layer of adhesive between the charge plate coupon and the charge plate substrate;

e. curing the assembly in the fixture to create an assembly having a desired final array length; and f. etching away the etchable substrate subsequent to the step of curing the charge plate assembly.

2. A method of fabricating a charge plate assembly as claimed in claim 1 wherein the etchable substrate comprises a copper foil.

3. A method of fabricating a charge plate assembly as claimed in claim 1 wherein the etchable substrate comprises beryllium-copper.

4. A method of fabricating a charge plate assembly as claimed in claim 1 wherein the charge plate substrate comprises alumina.

5. A method of fabricating a charge plate assembly having a controlled distance between adjacent electrodes, the method comprising the steps of;

a. forming a charge plate coupon on an etchable substrate, the charge plate coupon having a plurality of charging electrodes with an initial adjusted distance between adjacent electrodes;

b. assembling the charge plate coupon and a charge plate substrate to create a charge plate assembly by applying a layer of adhesive between the change plate coupon and the charge plate substrate;

c. curing the charge plate assembly; and d. etching away the etchable substrate subsequent to the step of curing the charge plate assembly.

6. A method of fabricating a charge plate assembly as claimed in claim 5 wherein the step of forming a charge plate coupon further comprises the step of bending the charge plate coupon to form a substantially right angle.

* * * * *